US012717925B1

(12) United States Patent
Geller et al.

(10) Patent No.: US 12,717,925 B1
(45) Date of Patent: Aug. 25, 2026

(54) SYSTEM, METHOD, AND COMPUTER PROGRAM FOR ASSESSING A CYBERSECURITY SYSTEM'S ABILITY TO SATISFY A DETECTION OBJECTIVE

(71) Applicant: Exabeam, Inc., Foster City, CA (US)

(72) Inventors: Adam Geller, Menlo Park, CA (US); Ananta Vadlamani, San Ramon, CA (US); Andrew Skrei, San Mateo, CA (US); Matthew Ward, Milford, MA (US); Neville Mascarenhas, San Jose, CA (US); Anil Mukundan, San Jose, CA (US); Ekramali Kazi, Mumbai (IN)

(73) Assignee: Exabeam, Inc., Foster City, CA (US)

( * ) Notice: Subject to any disclaimer, the term of this patent is extended or adjusted under 35 U.S.C. 154(b) by 252 days.

(21) Appl. No.: 18/232,656

(22) Filed: Aug. 10, 2023

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 2221/034; G06F 21/577
USPC .............................................................. 726/1
See application file for complete search history.

(56) References Cited

U.S. PATENT DOCUMENTS 5,941,947 A 8/1999 Brown et al.
6,223,985 B1 5/2001 DeLude
6,594,481 B1 7/2003 Johnson et al.
7,181,768 B1 2/2007 Ghosh et al.
7,624,277 B1 11/2009 Simard et al.
7,668,776 B1 2/2010 Ahles (Continued)

FOREIGN PATENT DOCUMENTS

| | | | |
|---|---|---|---|
| CN | 116074058 | 5/2023 | |
| CN | 116339814 A * | 6/2023 | ........... G06F 21/577 |
| WO | 2022151726 | 7/2022 | |

OTHER PUBLICATIONS

Bahnsen, Alejandro Correa "Classifying Phishing URLs Using Recurrent Neural Networks", IEEE 2017, 8 pages.

(Continued)

*Primary Examiner* — Josnel Jeudy
(74) *Attorney, Agent, or Firm* — Lessani Law Group, PC

(57) ABSTRACT

The present disclosure describes a system, method, and computer program for automatically assessing a cybersecurity system's ability to meet a cybersecurity detection objective across a set of measures used to implement the objective. To assess a detection objective, the system identifies a set of measures used to implement the detection objective. For each of the measures, the system periodically computes a measure score indicative of the system's ability to effectively implement the measure. The measure score is based on a comparison the fields relevant to the measure and the fields extracted by parsers for the measure during a time window. The system computes an objective score indicative of the cybersecurity system's ability to satisfy the detection objective during the time window based on each of the measure scores for the same time window. The objective score reflects the operational effectiveness of each of a plurality of different measures used to implement the detection objective during the time window.

21 Claims, 7 Drawing Sheets

(56) References Cited

U.S. PATENT DOCUMENTS 8,326,788 B2 12/2012 Allen et al.
8,443,443 B2 5/2013 Nordstrom et al.
8,479,302 B1 7/2013 Lin
8,484,230 B2 7/2013 Harnett et al.
8,539,088 B2 9/2013 Zheng
8,583,781 B2 11/2013 Raleigh
8,606,913 B2 12/2013 Lin
8,676,273 B1 3/2014 Fujisake
8,850,570 B1 9/2014 Ramzan
8,881,289 B2 11/2014 Basavapatna et al.
9,055,093 B2 6/2015 Borders
9,081,958 B2 7/2015 Ramzan et al.
9,129,110 B1 9/2015 Mason et al.
9,185,095 B1 11/2015 Moritz et al.
9,189,623 B1 11/2015 Lin et al.
9,202,052 B1 12/2015 Fang et al.
9,680,938 B1 6/2017 Gil et al.
9,690,938 B1 6/2017 Saxe et al.
9,692,765 B2 6/2017 Choi et al.
9,760,240 B2 9/2017 Maheshwari et al.
9,779,253 B2 10/2017 Mahaffey et al.
9,798,883 B1 10/2017 Gil et al.
9,832,138 B1 11/2017 Skalski et al.
9,843,596 B1 12/2017 Averbuch et al.
9,898,604 B2 2/2018 Fang et al.
10,063,582 B1 8/2018 Feng et al.
10,095,871 B2 10/2018 Gil et al.
10,178,108 B1 1/2019 Lin et al.
10,354,015 B2 7/2019 Kalchbrenner et al.
10,360,387 B2 7/2019 Jou et al.
10,397,272 B1 8/2019 Bruss et al.
10,419,470 B1 9/2019 Segev et al.
10,445,311 B1 10/2019 Saurabh et al.
10,467,631 B2 11/2019 Dhurandhar et al.
10,474,828 B2 11/2019 Gil et al.
10,496,815 B1 12/2019 Steiman et al.
10,621,343 B1 4/2020 Maciejak et al.
10,645,109 B1 5/2020 Lin et al.
10,685,293 B1 6/2020 Heimann et al.
10,803,183 B2 10/2020 Gil et al.
10,819,724 B2 10/2020 Amiri et al.
10,841,338 B1 11/2020 Lin et al.
10,887,325 B1 1/2021 Lin et al.
10,944,777 B2 3/2021 Lin et al.
11,017,173 B1 5/2021 Lu et al.
11,080,483 B1 8/2021 Islam et al.
11,080,591 B2 8/2021 van den Oord et al.
11,128,600 B2 9/2021 Bansal et al.
11,140,167 B1 10/2021 Lin et al.
11,151,471 B2 10/2021 Niininen et al.
11,178,168 B1 11/2021 Lin et al.
11,245,716 B2 2/2022 Roelofs et al.
11,423,143 B1 8/2022 Lin et al.
11,431,741 B1 8/2022 Lin et al.
11,463,331 B1 10/2022 Arlitt et al.
11,625,366 B1 4/2023 Steiman et al.
11,736,527 B1 8/2023 Durairaj et al.
11,843,505 B1 12/2023 Cruise et al.
11,956,253 B1 4/2024 Lin et al.
12,034,732 B2 7/2024 Lin et al.
12,063,226 B1 8/2024 Lin et al.
12,164,402 B1 12/2024 Xie et al.
12,368,729 B1 7/2025 Lin et al.
12,399,984 B1 8/2025 Vykunta et al.
2002/0107926 A1 8/2002 Lee
2003/0065926 A1 4/2003 Schultz et al.
2003/0147512 A1 8/2003 Abburi
2004/0073569 A1 4/2004 Knott et al.
2006/0090198 A1 4/2006 Aaron
2007/0156771 A1 7/2007 Hurley et al.
2007/0282778 A1 12/2007 Chan et al.
2008/0028467 A1 1/2008 Kommareddy et al.
2008/0040802 A1 2/2008 Pierson et al.
2008/0170690 A1 7/2008 Tysowski
2008/0262990 A1 10/2008 Kapoor et al.
2008/0301780 A1 12/2008 Ellison et al.
2009/0144095 A1 6/2009 Shahi et al.
2009/0171752 A1 7/2009 Galvin et al.
2009/0292954 A1 11/2009 Jiang et al.
2009/0293121 A1 11/2009 Bigus et al.
2010/0125911 A1 5/2010 Bhaskaran
2010/0191763 A1 7/2010 Wu
2010/0269175 A1 10/2010 Stolfo et al.
2010/0284282 A1 11/2010 Golic
2011/0167495 A1 7/2011 Antonakakis et al.
2012/0278021 A1 11/2012 Lin et al.
2012/0316835 A1 12/2012 Maeda et al.
2012/0316981 A1 12/2012 Hoover et al.
2013/0080631 A1 3/2013 Lin
2013/0086273 A1 4/2013 Wray et al.
2013/0117554 A1 5/2013 Ylonen
2013/0197998 A1 8/2013 Buhrmann et al.
2013/0227643 A1 8/2013 Mccoog et al.
2013/0268260 A1 10/2013 Lundberg et al.
2013/0305357 A1 11/2013 Ayyagari et al.
2013/0340028 A1 12/2013 Rajagopal et al.
2014/0007238 A1 1/2014 Magee
2014/0090058 A1 3/2014 Ward et al.
2014/0101759 A1 4/2014 Antonakakis et al.
2014/0315519 A1 10/2014 Nielsen
2014/0365418 A1 12/2014 Grant
2015/0026027 A1 1/2015 Priess et al.
2015/0039543 A1 2/2015 Athmanathan et al.
2015/0046969 A1 2/2015 Abuelsaad et al.
2015/0058993 A1 2/2015 Choi et al.
2015/0100558 A1 4/2015 Fan
2015/0121503 A1 4/2015 Xiong
2015/0205944 A1 7/2015 Turgeman
2015/0215325 A1 7/2015 Ogawa
2015/0339477 A1 11/2015 Abrams et al.
2015/0341379 A1 11/2015 Lefebvre et al.
2015/0363691 A1 12/2015 Gocek et al.
2016/0005044 A1 1/2016 Moss et al.
2016/0021117 A1 1/2016 Harmon et al.
2016/0063397 A1 3/2016 Ylipaavalniemi et al.
2016/0292592 A1 10/2016 Patthak et al.
2016/0306965 A1 10/2016 Iyer et al.
2016/0364427 A1 12/2016 Wedgeworth, III
2017/0019506 A1 1/2017 Lee et al.
2017/0024135 A1 1/2017 Christodorescu et al.
2017/0127016 A1 5/2017 Yu et al.
2017/0155652 A1 6/2017 Most et al.
2017/0161451 A1 6/2017 Weinstein et al.
2017/0178026 A1 6/2017 Thomas et al.
2017/0213025 A1 7/2017 Srivastav et al.
2017/0223035 A1 8/2017 Watanabe
2017/0236081 A1 8/2017 Grady Smith et al.
2017/0264679 A1 9/2017 Chen et al.
2017/0318034 A1 11/2017 Holland et al.
2017/0322959 A1 11/2017 Tidwell et al.
2017/0323636 A1 11/2017 Xiao et al.
2018/0004961 A1 1/2018 Gil et al.
2018/0039699 A1 2/2018 Wan et al.
2018/0048530 A1 2/2018 Nikitaki et al.
2018/0063168 A1 3/2018 Sofka
2018/0069893 A1 3/2018 Amit et al.
2018/0075343 A1 3/2018 van den Oord et al.
2018/0089304 A1 3/2018 Vizer et al.
2018/0097822 A1 4/2018 Huang et al.
2018/0144139 A1 5/2018 Cheng et al.
2018/0157963 A1 6/2018 Salti et al.
2018/0165554 A1 6/2018 Zhang et al.
2018/0181883 A1 6/2018 Ikeda
2018/0190280 A1 7/2018 Cui et al.
2018/0234443 A1 8/2018 Wolkov et al.
2018/0248895 A1 8/2018 Watson et al.
2018/0285340 A1 10/2018 Murphy et al.
2018/0288063 A1 10/2018 Koottayi et al.
2018/0288086 A1 10/2018 Amiri et al.
2018/0307994 A1 10/2018 Cheng et al.
2018/0316701 A1 11/2018 Holzhauer et al.
2018/0322368 A1 11/2018 Zhang et al.
2019/0014149 A1 1/2019 Cleveland et al.
2019/0028496 A1 1/2019 Fenoglio et al.

(56) References Cited

U.S. PATENT DOCUMENTS

2019/0034641 A1 1/2019 Gil et al.
2019/0066185 A1 2/2019 More et al.
2019/0080225 A1 3/2019 Agarwal
2019/0081957 A1 3/2019 Thrash et al.
2019/0089721 A1 3/2019 Pereira et al.
2019/0089727 A1 3/2019 Mulchandani et al.
2019/0103091 A1 4/2019 Chen
2019/0114419 A1 4/2019 Chistyakov et al.
2019/0122078 A1 4/2019 Ura et al.
2019/0124045 A1 4/2019 Zong et al.
2019/0124093 A1 4/2019 Sharma et al.
2019/0132629 A1 5/2019 Kendrick
2019/0149565 A1 5/2019 Hagi et al.
2019/0164092 A1* 5/2019 Argyros ................ G06F 3/0482
2019/0171655 A1 6/2019 Psota et al.
2019/0173804 A1 6/2019 Nicas et al.
2019/0182280 A1 6/2019 La Marca et al.
2019/0205750 A1 7/2019 Zheng et al.
2019/0207969 A1 7/2019 Brown
2019/0213247 A1 7/2019 Pala et al.
2019/0244603 A1 8/2019 Angkititrakul et al.
2019/0303703 A1 10/2019 Kumar et al.
2019/0318100 A1 10/2019 Bhatia et al.
2019/0334784 A1 10/2019 Kvernvik et al.
2019/0349400 A1 11/2019 Bruss et al.
2019/0378051 A1 12/2019 Widmann et al.
2019/0384762 A1 12/2019 Hill et al.
2020/0021607 A1 1/2020 Muddu et al.
2020/0021620 A1 1/2020 Purathepparambil et al.
2020/0034481 A1 1/2020 Asplund et al.
2020/0082098 A1 3/2020 Gil et al.
2020/0137104 A1 4/2020 Hassanzadeh et al.
2020/0177618 A1 6/2020 Hassanzadeh et al.
2020/0228557 A1 7/2020 Lin et al.
2020/0302118 A1 9/2020 Cheng et al.
2020/0327886 A1 10/2020 Shalaby et al.
2021/0081459 A1 3/2021 Chung
2021/0089884 A1 3/2021 Macready et al.
2021/0125050 A1 4/2021 Wang
2021/0126938 A1 4/2021 Trost et al.
2021/0133331 A1 5/2021 Lipkis et al.
2021/0182612 A1 6/2021 Zeng et al.
2021/0232768 A1 7/2021 Ling et al.
2021/0248240 A1 8/2021 Comish et al.
2021/0398043 A1* 12/2021 Lacey ................ G06Q 10/0635
2022/0006814 A1 1/2022 Lin et al.
2022/0030017 A1 1/2022 Infante-Lopez et al.
2022/0076164 A1 3/2022 Conort et al.
2022/0147622 A1 5/2022 Chesla
2022/0232032 A1 7/2022 Mo et al.
2022/0245093 A1 8/2022 Batsakis et al.
2022/0247776 A1* 8/2022 Hecht ................. H04L 63/1433
2024/0289464 A1 8/2024 Tishbi et al.
2024/0403428 A1* 12/2024 Lal ........................ G06F 21/566
2025/0209180 A1* 6/2025 Agrawal ................... G06F 8/71
2025/0217673 A1* 7/2025 Silver ....................... G06F 8/30

OTHER PUBLICATIONS

Chen, Jinghui, et al., “Outlier Detection with Autoencoder Ensembles”, Proceedings of the 2017 SIAM International Conference on Data Mining, pp. 90-98.
Cooley, R., et al., “Web Mining: Information and Pattern Discovery on the World Wide Web”, Proceedings Ninth IEEE International Conference on Tools with Artificial Intelligence, Nov. 3-8, 1997, pp. 558-567.
DatumBox Blog, “Machine Learning Tutorial: The Naïve Bayes Text Classifier”, DatumBox Machine Learning Blog and Software Development News, Jan. 2014, pp. 1-11.
Fargo, Farah “Resilient Cloud Computing and Services”, PhD Thesis, Department of Electrical and Computer Engineering, University of Arizona, 2015, pp. 1-115.
Freeman, David, et al., “Who are you? A Statistical Approach to Measuring User Authenticity”, NDSS, Feb. 2016, pp. 1-15.
Goh, Jonathan et al., “Anomaly Detection in Cyber Physical Systems using Recurrent Neural Networks”, IEEE 2017, pp. 140-145.
Guo, Diansheng et al., “Detecting Non-personal and Spam Users on Geo-tagged Twitter Network”, Transactions in GIS, 2014, pp. 370-384.
Ioannidis, Yannis, “The History of Histograms (abridged)”, Proceedings of the 29th VLDB Conference (2003), pp. 1-12.
Kim, Jihyun et al., “Long Short Term Memory Recurrent Neural Network Classifier for Intrusion Detection”, IEEE 2016, 5 pages.
Malik, Hassan, et al., “Automatic Training Data Cleaning for Text Classification”, 11th IEEE International Conference on Data Mining Workshops, 2011, pp. 442-449.
Mietten, Markus et al., “ConXsense-Automated Context Classification for Context-Aware Access Control”, Asia CCS’14, 2014, pp. 293-304.
Poh, Norman, et al., “EER of Fixed and Trainable Fusion Classifiers: A Theoretical Study with Application to Biometric Authentication Tasks”, Multiple Classifier Systems, MCS 2005, Lecture Notes in Computer Science, vol. 3541, pp. 1-11.
Shi, Yue et al., “Cloudlet Mesh for Securing Mobile Clouds from Intrusions and Network Attacks”, 2015 3rd IEEE International Conference on Mobile Cloud Computing, Services, and Engineering, pp. 109-118.
Taylor, Adrian et al., “Anomaly Detection in Automobile Control Network Data with Long Short-Term Memory Networks”, IEEE 2016, pp. 130-139.
Taylor, Adrian “Anomaly-Based Detection of Malicious Activity in In-Vehicle Networks”, Ph.D. Thesis, University of Ottawa 2017, 151 pages.
Wang, Alex Hai, “Don’t Follow Me Spam Detection in Twitter”, International Conference on Security and Cryptography, 2010, pp. 1-10.
Wang, Shuhao et al., “Session-Based Fraud Detection in Online E-Commerce Transactions Using Recurrent Neural Networks”, 2017, 16 pages.
Zhang, Ke et al., “Automated IT System Failure Prediction: A Deep Learning Approach”, IEEE 2016, pp. 1291-1300.

* cited by examiner

EXAMPLE SOFTWARE ARCHITECTURE

RECOMMENDING PARSER IMPROVEMENTS

OUTCOMES NAVIGATOR

715

99+ N

Use Case Category
Malicious Insiders(8)

Workforce Protection

Privilege Abuse

Physical Security

Destruction of Data

Data Leak

Data Access

Audit Tampering

Abnormal Authentication & Access

Workforce Protection Recommendations Export Organizational Coverage Recommendations

Products should strive for Parser Calibration Tier Average 1 How to improve Parsers

| VENDOR | PRODUCT 720 | CATEGORY 725 | PARSER CALIBRATION TIER AVERAGE 730 | ACTION STATUS 735 |
| --- | --- | --- | --- | --- |
| Palo Alto Networks | Palo Alto NGFW | Firewall | 4 | Reviewed |
| Quest Software | Quest Change Auditor for Active Directory | Event Management Forwarding | 4 | For Review |
| Check Point | Check Point Security Gateway | Vpn Virtual Private Network | 4 | For Review |
| Exabeam | Audit Log | Siem Security Information And Event Management | 1 | Reviewed |

740

710

Rows per page: 5 1-4 of 4

Add products from these categories

Products from these categories provide the field and activity type detail needed for full enablement of this use case. Some products provide more than others so consider "defense in depth" of multiple products in this category if possible

Access Management
0 products enabled
755

Epp (Endpoint Protection)
0 products enabled
760

Email Security
0 products enabled
765

File Sharing
0 products enabled
770

Edr (Endpoint Detection & Response)
0 products enabled
775

750

Ensure events are not filtered

Events could be filtered out anywhere along the chain from firewall rules and process or Exabeam Event Selection. In addition permissions on cloud agents may not be enabled to see all events. Please verify key events are not filtered out.

FIG. 7

SYSTEM, METHOD, AND COMPUTER PROGRAM FOR ASSESSING A CYBERSECURITY SYSTEM'S ABILITY TO SATISFY A DETECTION OBJECTIVE

BACKGROUND OF THE INVENTION

1. Field of the Invention

This invention relates generally to cybersecurity systems, and, more specifically, to assessing a cybersecurity system's ability to satisfy detection objectives.

2. Description of the Background Art

A cybersecurity system monitors entity behavior in a network in order to detect cybersecurity threats to an organization. There are many types of threats, and an organization will typically use a cybersecurity system for many detection objectives. A detection objective is a goal to monitor against a type of threat. For example, there may be several detection objectives related to each of the following: malicious insider threats, external threats, and compromised insiders. Each detection objective may be associated with a number of measures within the cybersecurity system. Each measure is a way to implement the detection objective. Examples of measures are analytic rules, correlation rules, and dashboards.

Organizations will typically employ thousands of analytic and/or correlation rules across all its detection objectives. The rules are used to monitor for conditions within the network. For example, there may be rules to detect if a user is logging in from a new location, accessing a machine that the user does not normally access, etc. If the rule triggers, it means the condition was detected. A number of rules triggering during over a period of time usually signals an elevated cybersecurity risk.

Some rules will come with the cybersecurity product, others will be custom rules created by the organization. Customers of the cybersecurity product may choose to enable some rules and not able other rules. Different organizations will assign different importance to different rules and select which rules to enable based on their priorities. Therefore, a measure for the same objective may be implemented differently across organizations.

To evaluate a rule, a cybersecurity system must receive the applicable input data related to network events in order to determine whether the condition for the rule has been satisfied. Rules have fields, and a cybersecurity system evaluates a rule by determining if data associated with the session/time window being monitored satisfies the fields in the rule.

The input data required for evaluating the rules is received from a variety of data sources in the form of data logs. Cybersecurity systems parse input data logs from data sources to extract the data required to evaluate rules.

Most data sources are networking products licensed by an organization. Within a particular data product category (e.g., firewalls), there may be several vendors of the product from which an organization can choose. In most cases, a data source is essentially the combination of a vendor and a product within a data category (i.e., a particular product from a vendor within a data category). Therefore, within a data category, there are typically several data source options, and each data sources may format and produce the data logs in its own unique way. The parsers within the cybersecurity system must be configured correctly to extract the data from the particular data sources used by the organization. If a parser for a data source is not configured correctly, the cybersecurity system will not be able to use some or all of the data from the data source.

If a rule is enabled, but a cybersecurity system does not receive or correctly parse the data required to evaluate the rule, the rule is effectively not being used, and the organization is not receiving the cybersecurity protection benefits the rule is supposed to provide.

It is very difficult for cybersecurity analysts to look across thousands of rules, understand which ones apply to which detection objectives, assess how well the cybersecurity system is meeting the objectives, and determine how to improve the system's ability to satisfy each detection objective. It is extremely time consuming to determine if the system is receiving and parsing the required data for each enabled rule. Moreover, even if the time is taken to do this for each rule, input data sources, parsers, and enabled rules can change over time, and therefore such assessment has to be done on a periodic basis in order to be relevant.

Known solutions will map the type of data required for a measure to a set of input data categories and recommend that the organization subscribe to a data source from each of the data categories. For example, if some of the rules require authentication data, they recommend receiving input logs from an authentication source. However, these solutions are inadequate. The data received from diverse data sources is highly variable and depends on the specific licenses and configurations set up by the organization being monitored. Just because an organization is subscribing to data sources that should theoretically provide all the data required to evaluate all enabled rules does not mean that the system is actually receiving the data it needs. For example, one data source may be a firewall from a particular vendor. The vendor may offer be 5-10 licensable components of the firewall. The data you are netting from the firewall depends on which firewall components the organization has licensed from the vendor. For instance, if the organization has not licensed the VPN components of a firewall, it will not receive the VPN events from the firewall.

Moreover, even if the organization is receiving the required data, the parsers may not be configured correctly to adequately extract the necessary fields from the data logs. The highly variable input data can result in a mismatch between what the parsers should output and what they are actually outputting. For example, the format of the input data may change over time, and the parsers need to change accordingly.

Therefore, there is strong demand for an automated solution that can identify data required for each of an organization's detection objectives, look at the output of the parsers, periodically measure how well an organization is able to meet its detection objectives across the diverse measures associated with each objective, and identify and recommend the actions that will have the most impact on improving performance for each of the objectives.

SUMMARY OF THE DISCLOSURE

The present disclosure describes a system, method, and computer program for automatically assessing a cybersecurity system's ability to meet a cybersecurity detection objective across a set of measures used to implement the objective. A detection objective may correspond to a cybersecurity category or to techniques in an attack framework (e.g., the MITRE attack framework).

To assess a detection objective, the system identifies a set of measures used to implement the detection objective. For example, the measures may include analytics rules, correlation rules, and dashboards. For each of the measures, the system periodically computes a measure score indicative of the system's ability to effectively implement the measure.

To compute a measure score, the system identifies a first set of data fields relevant to a measure. For instance, for a set of analytics rules, the system looks at the data fields used in the rules. The system also identifies a set of data sources and a set of parsers associated with the measure. The data sources provide log data usable for evaluating the measure, and the parsers parse the log data for the measure.

The system receives the log data from the set of data sources over a computer network. The system parses the log data during a time window using the set parsers to extract a second set of data fields from the log data. The first set of data fields relevant for the measure are then compared to the second set of data fields extracted by the parsers within the time window. The system computes a measure score for the measure based on the comparison, wherein the measure score is associated with the time window. In other words, the measure score reflects how much of the data required to fully implement the measure was actually received by the system and extracted by the parsers during the time window.

The system computes an objective score indicative of the cybersecurity system's ability to satisfy the detection objective during the time window based on each of the measure scores for the same time window. The objective score reflects the operational effectiveness of each of a plurality of different measures used to implement the detection objective during the time window. In calculating the objective score, some measure scores may be weighted more heavily than others, depending on their relative importance in implementing the detection objective.

The measure and objective scores are computed periodically to enable an organization to see how parser changes, the addition/deletion of rules, and the addition/deletion of data sources affects the objective score. In certain embodiments, a graphical representation of the objective score trend over time is displayed in the user interface.

The above-described method may be performed for multiple detection objectives, each associated with one or more measures. In certain embodiments, for each detection objective, the system provides recommendations that will lead to an improved objective score for the objective. For example, the recommendations may include parser improvements and adding a data source from a new data category to the input data for the objective.

BRIEF DESCRIPTION OF THE DRAWINGS

FIG. 7 is a screenshot that illustrates an example user interface in which recommendations that will lead to improvements in the objective score are displayed.

DETAILED DESCRIPTION OF THE PREFERRED EMBODIMENTS

The present disclosure describes a system, method, and computer program for automatically assessing a cybersecurity system's ability to meet a cybersecurity detection objective across a set of measures used to implement the objective. A detection objective is a goal to monitor against a type of threat. A detection objective may correspond to a cybersecurity category or to techniques in an attack framework (e.g., the MITRE attack framework). For example, there may be detection objectives related to detecting malicious insider threats (e.g., detecting any privilege abuse and data leaks), external threats (e.g., malware, ransomware, phishing, cryptomining and brute force attacks), and comprised insiders (e.g., detecting privilege escalation, lateral movement, evasion, data exfiltration, and compromised log in credentials).

The methods disclosed herein are performed by a computer system ("the system" or "the cybersecurity system"), such as a cybersecurity system that detects cybersecurity threats in a network.

1. Computing an Objective Score and Providing Recommendations

Figure 1:
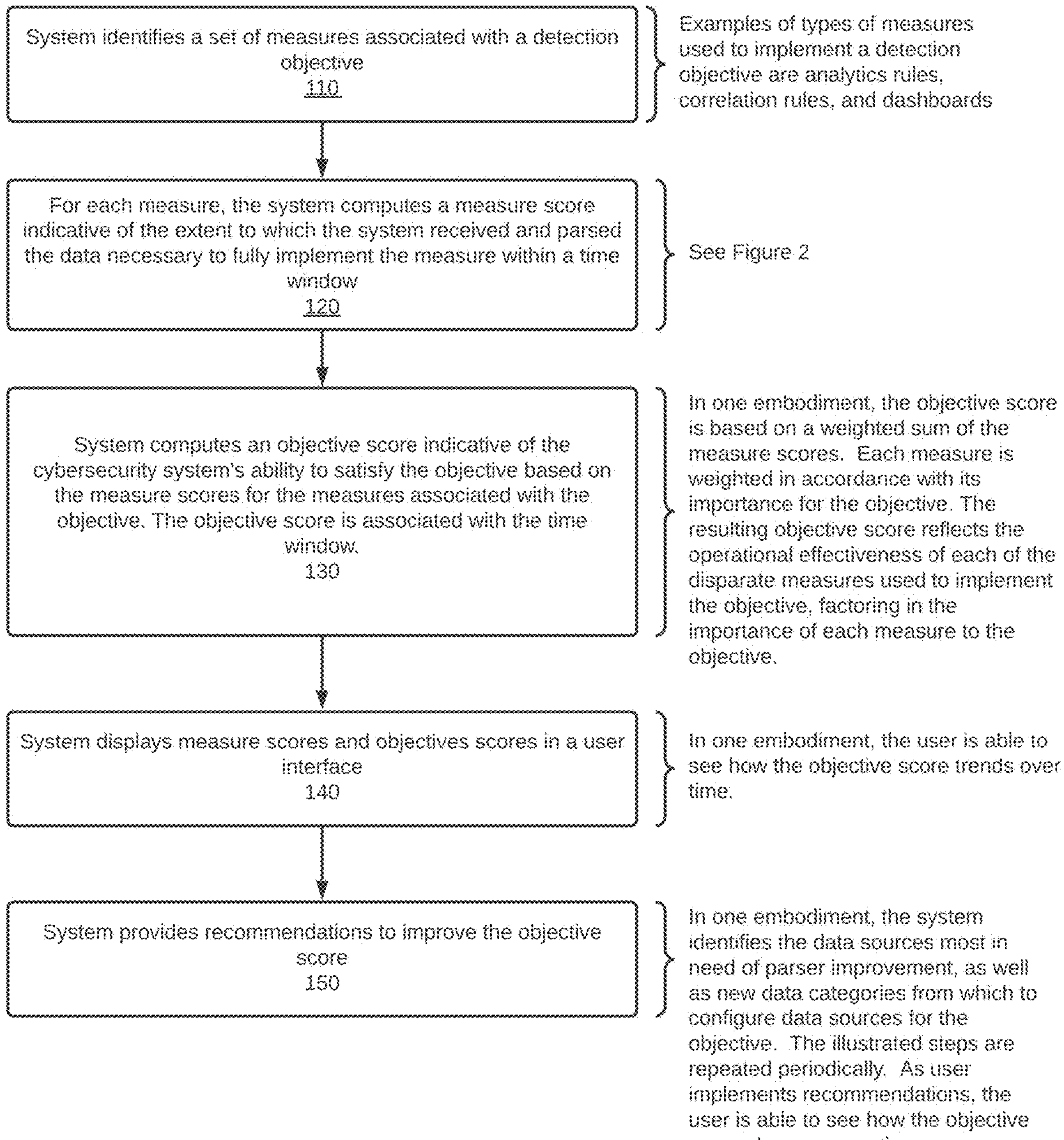
FIG. 1 is a flowchart that illustrate method, according to one embodiment, for assessing a cybersecurity system's ability to satisfy a detection objective across a set of disparate measures.

FIG. 1 illustrates a method for assessing a cybersecurity system's ability to satisfy a detection objective across a set of disparate measures. The system identifies a set of measures associated with a detection objective (step 110). Examples of types of measures used to implement a detection objective are analytics rules, correlation rules, and dashboards. For each measure, the system computes a measure score indicative of the extent to which the system received and extracted the data necessary to fully implement the measure within a time window (e.g., a 30-day period) (step 120). A method for computing a measure score is described with respect to FIG. 2.

The system computes an objective score indicative of the cybersecurity system's ability to satisfy the objective during the time window based on the measure scores for the measures associated with the objective and the same time window (step 130). In one embodiment, the objective score is based on the weighted sum of the measure scores. Each measure is weighted in accordance with its importance for the objective (this may be a subjective determination in configuring the system). The resulting objective score reflects the operational effectiveness during the time window of each of the disparate measures used to implement the objective, factoring in the importance of each measure to the objective.

Figure 6:
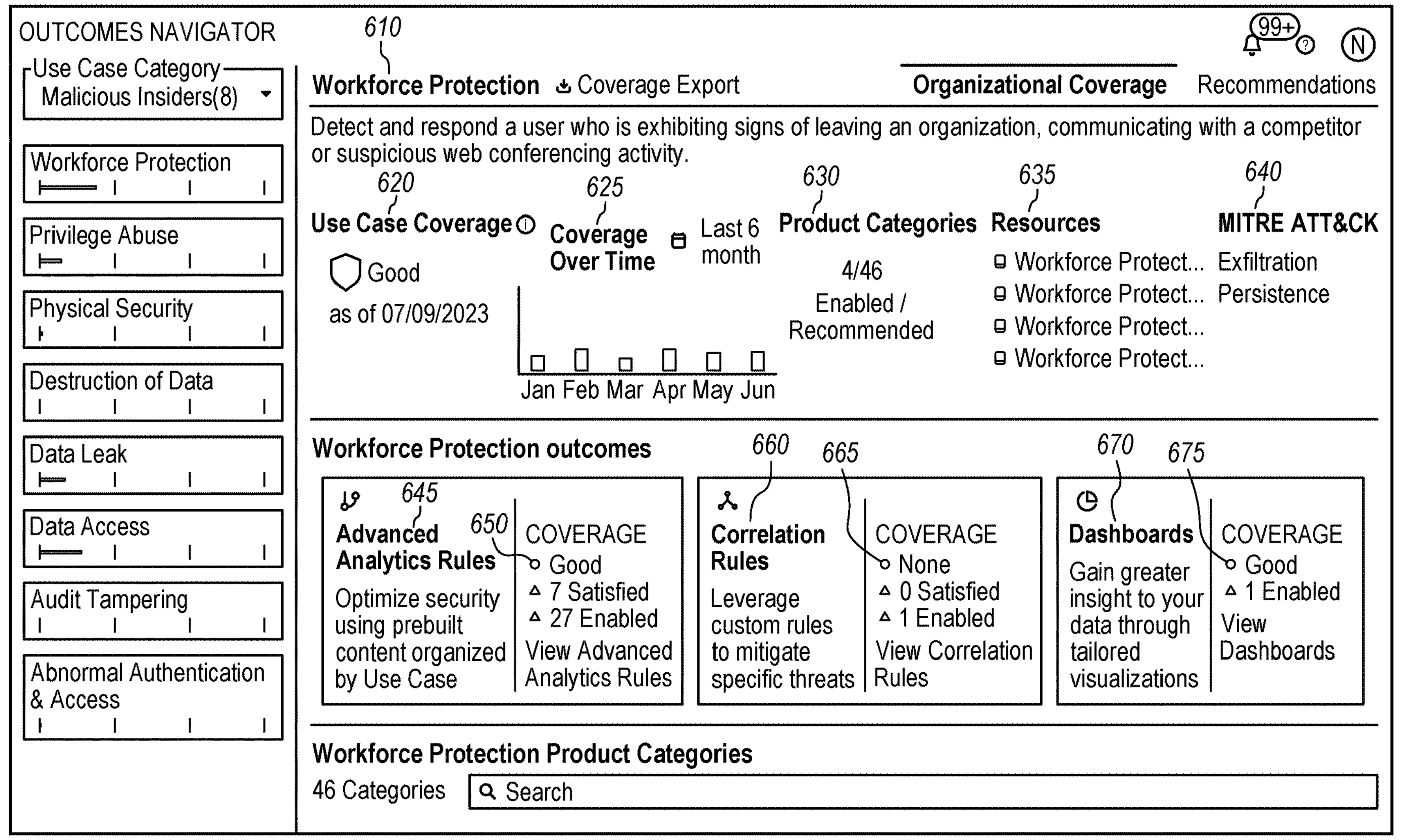
FIG. 6 is a screenshot that illustrates an example user interface in which objective scores and measure scores are displayed.

The system displays measure scores and objective scores in a user interface (step 140), such as the user interface in FIG. 6. In one embodiment, the user is able to see how the objective score trends over time.

Figure 4:
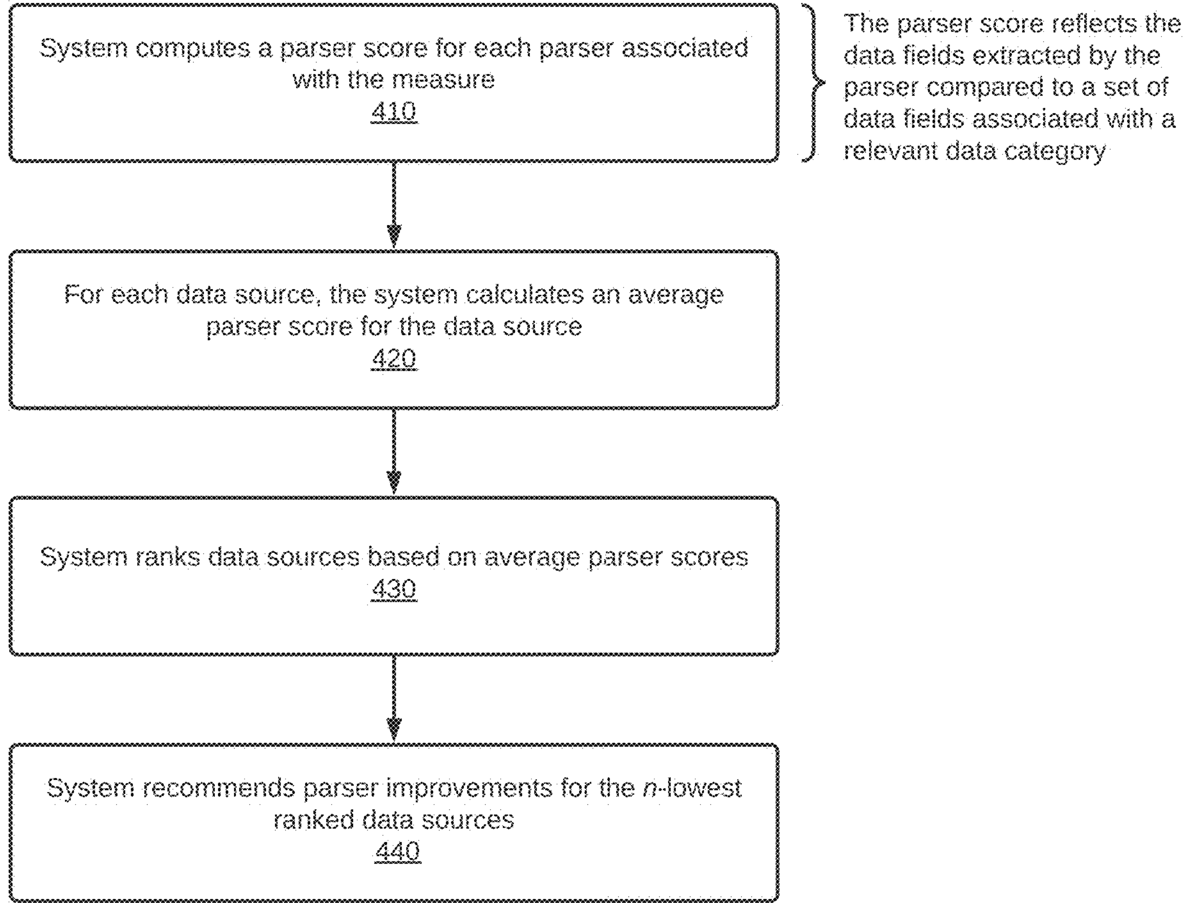
FIG. 4 is a flowchart that illustrate method, according to one embodiment, for recommending parser improvements for a measure.
Figure 5:
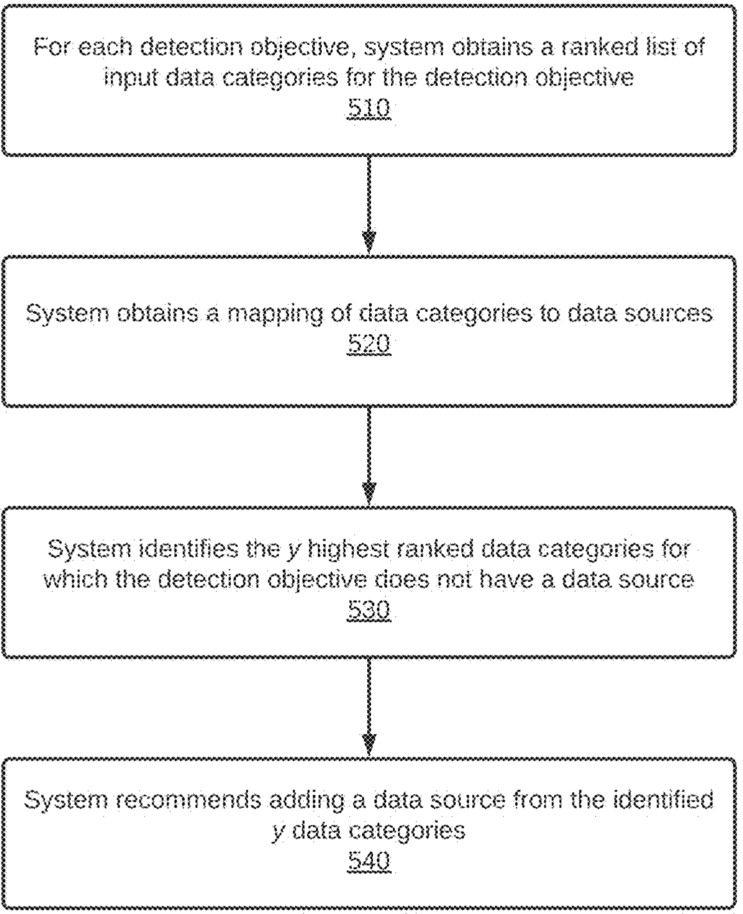
FIG. 5 is a flowchart that illustrate method, according to one embodiment, for recommending new data categories to configure for an objective.

The system also provides recommendations that will lead to an improved objective score (step 150). In one embodiment, the system identifies the data sources most in need of parser improvements. The system also recommends new data categories from which to configure data sources for the objective. FIGS. 4 and 5 illustrate methods for providing recommendations in more detail.

The steps of FIG. 1 are repeated periodically. As a user implements recommendations, the user is able to see how the objective score changes over time.

2. Computing a Measure Score

Figure 2:
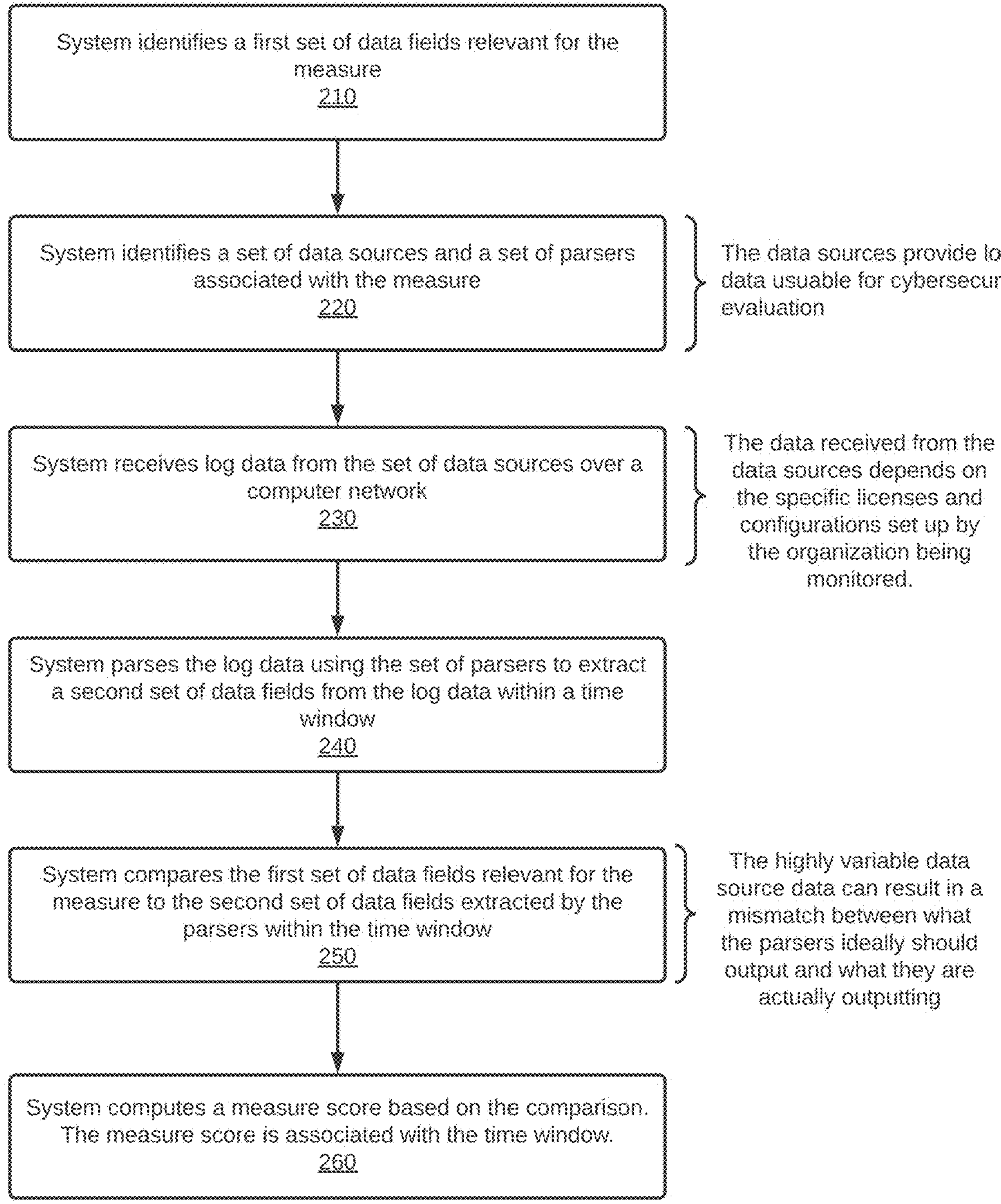
FIG. 2 is a flowchart that illustrate method, according to one embodiment, for computing a measure score for a measure.

FIG. 2 illustrates a method for computing a measure score for a measure. The system identifies a first set of data fields relevant for the measure (step 210). The system also identifies a set of data sources and a set of parsers associated with the measure (step 220). The data sources provide log data usable for evaluating the measure, and the parsers parse the log data for the measure.

The system receives log data from the set of data sources over a network (step 230). The data received from the data sources depends on the specific licenses and configurations set up by the organizations being monitored.

The system parses the log data using a set of parsers to extract a second set of data fields from the log data within a time window (step 240). In one embodiment, the log data is parsed in substantially real time, and the log data is both received and parsed within the time window.

The system compares the first set of data fields relevant for the measure to the second set of data fields extracted by the parsers within the time window (step 250). The system computer a measure score based on the comparison (step 260). The measure score is associated with the time window.

2.1 Example of Computing a Measure Score for Analytics Rules

In one embodiment, in computing a measure score for an analytics rules measure, step 250 comprises determining how many rules are fully satisfied by the second set of data fields extracted from the parsers. A rule is fully satisfied if the parsers extract all the data fields used by the rule. In such embodiment, the formula for computing a measure score for analytic rules is as follows:

N=Number of satisfied analytics rules during the time window.

D=Number of enabled analytics rules for the measure during the time window.

$$\text{Subscore}=N/D\times 100$$

Measure Score-Fourth Score/Third Score/Second Score/First Score if Subscore∈⌈[0, 1)/[1, 50)⌉/(50, 75]/[75, 100], wherein the fourth score is the worst score and the first score is the best score. Examples of the first-fourth scores are:

Fourth="None"
Third="Good"
Second="Better"
First="Best"

2.2 Example of Computing a Measure Score for Correlation Rules or a Dashboard

In one embodiment, a measure score for a correlation rules measure or a dashboard measure is computed as follows:

N=Number of fields in the second set of data fields for the measure (i.e., number of extracted fields by the parsers).

D-Number of fields in the first set of data fields for the measure (i.e., number of fields used for the measure).

$$\text{Subscore}=N/D\times 100$$

Measure Score=Fourth Score/Third Score/Second Score/First Score if Subscore E ⌈[0, 1)/[1, 50)⌉/(50, 75]/[75, 100], wherein the fourth score is the worst score and the first score is the best score. Examples of the first-fourth scores are:

Fourth="None"
Third="Good"
Second="Better"
First="Best"

2.3 Example of Computing Objective Score from the Measure Scores

In one embodiment, the objective score is computed as follows:

$S_i$=Score of each measure associated with the objective for a time window $N_i$=count of each measure, where i is the ith measure $N=N_A+N_c+N_D$=count of all measures.

$W_i=N_i/N$=weightage of each measure.

$$\text{Objective Subscore}=(S_A\times W_A)+(S_C\times W_C)+(S_D\times W_D)$$

Objective Score=Fourth Score/Third Score/Second Score/First Score if Objective Subscore∈⌈[0, 1)/[1, 50)⌉/(50, 75]/[75, 100], wherein the fourth score is the worst score and the first score is the best score. Examples of the first-fourth scores are:

Fourth="None"
Third="Good"
Second="Better"
First="Best"

3. Example Software Architecture and Data Flow

Figure 3:
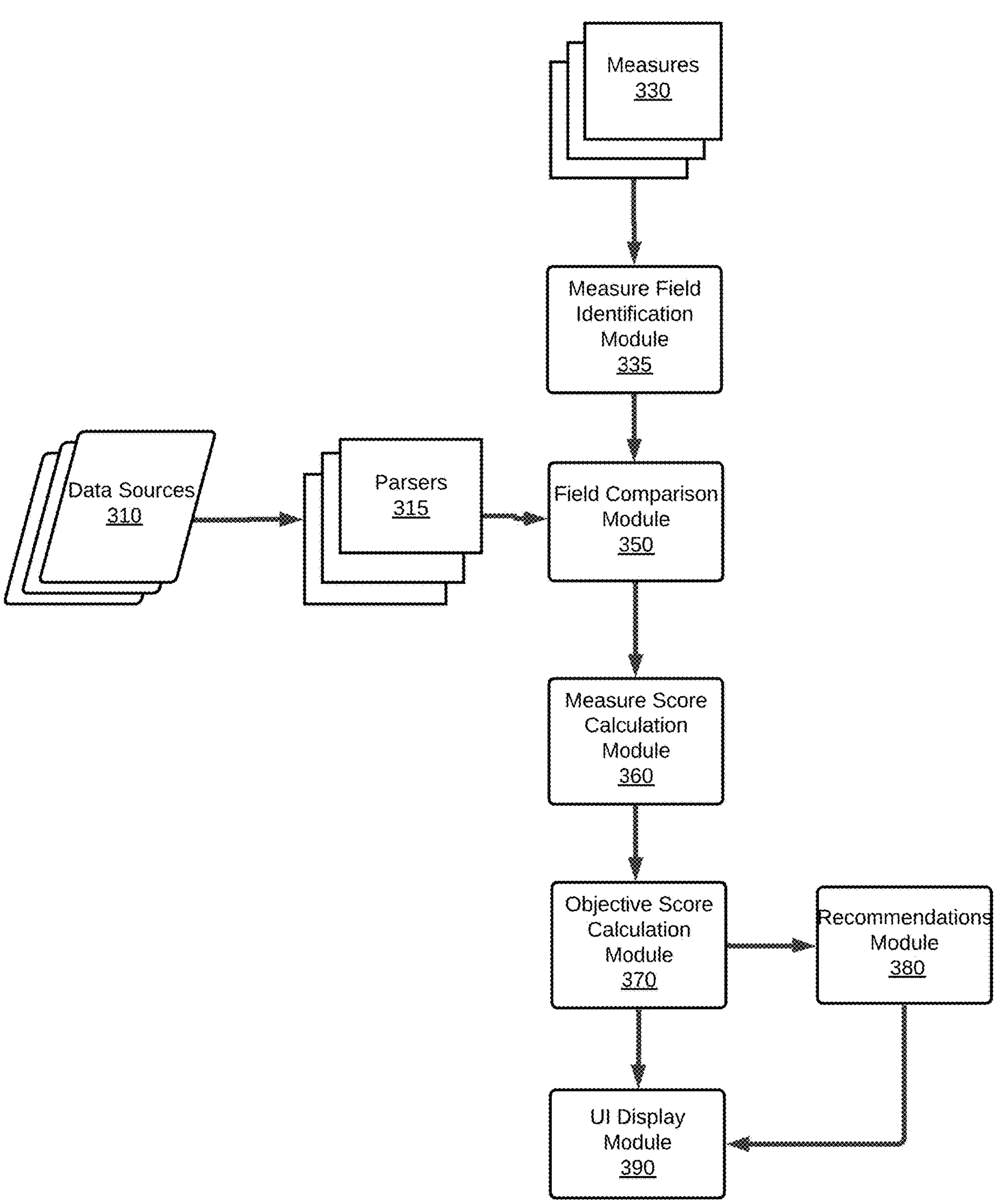
FIG. 3 is a block diagram that illustrates an example software architecture and data flow for the cybersecurity system.

FIG. 3 illustrates an example software architecture and data flow for the cybersecurity system. The modules displayed in FIG. 3 are the modules relevant to the methods disclosed herein. Those skilled in the art will appreciate that a cybersecurity system will have other modules related to functions that are outside the scope of this disclosure. A Measure Field Identification Module 335 identifies data fields relevant for measures 330 running in the cybersecurity system. Parsers 315 parses log data from input data sources 310. The Field Comparison Module 350 compares the fields relevant for a measure to the fields extracted by the parsers used for the measure. The Measure Score Calculation Module 360 calculates a measure score for the measure based on the comparison. The Objective Score Calculation Module 370 computes an objective score for an objective based on the measures scores for each of the measures used to implement the objective. The Recommendation Module 380 recommends actions that would improve the objective score. The UI Display Module 390 displays measure scores, objective scores, and recommendations in a user interface.

4. Recommending Parser Improvements

FIG. 4 illustrates a method for recommending parser improvements for a measure. The system computes a parser score for each parser associated with the measure (step 410). Each parsers parses log data from a data source, and each data source is associated with a data category. The parsers are scored by comparing the fields extracted by the parsers to a set of fields considered relevant to the data category associated with the data source from which the parser parses data logs. In one embodiment, each data category is associated with a set of data fields classified as "core" (the field is required for a log to be meaningfully parsed), "detection" (the field is necessary for a detecting a specific type of risk), and "informational" (the field is not required for the analytics rules, but is informational). These fields are referred to herein as "CDI Fields." In this embodiment, the parsers are scored based on a ratio of: (1) the number of CDI fields extracted by the parser from a log to (2) the number of CDI fields a log contains.

For each data source associated with the measure, the system calculates an average parser score for the data source (step 420). For example, if three parsers are used to parse data for the measure from Data Source A, the three parser scores from step 410 are averaged to get an average parser score for Data Source A.

The system ranks data sources based on the average parser score (step 430). The system then recommends that the parsers be improved for the n-lowest ranked data sources, wherein n is an integer greater than zero (step 440). This enables cybersecurity analysts at an organization to easily see which parsers need work.

5. Recommending New Data Categories to Configure for an Objective

FIG. 5 illustrates a method for recommending new data categories to configure for an objective. For each detection objective, the system obtains a ranked list of input data categories for the detection objective (step 510). The system also obtains a mapping of data sources to data categories (step 520). The system uses the ranked list and the mapping to identify the y highest ranked data categories for which the detection objective does not have a data source (step 530). The system recommends adding a data source from the identified y categories, where y is an integer greater than zero (step 540).

6. Example Screenshots

FIG. 6 illustrates an example user interface in which objective scores and measure scores are displayed. In this example, the range of objective and measure scores is "none,", "good," "better," and "best," with "none" being the lowest score and "best" being the top score.

The user interface is titled with the name 610 for the detection objective, which in this example is "Workforce Protection." This objective is to detect and respond to a user who is exhibiting signs of leaving an organization, communicating with a competitor, or engaging in suspicious web conferencing activity. In this example, the measure scores and the objective scores are computed on a monthly basis.

The user interface includes a score 620 for the detection objective for the most recent month, a graph 625 that illustrates the objective score over the past 6 months, a ratio 630 of the product categories for which the objective has a data source verses the number of data categories for which a data source is recommended, resource information 635, and the stages 640 in the MITRE attack framework to which the objective is related. The user interface also includes the measure scores (650, 665, 675) for the measures (645, 660, 670) associated with the Workforce Protection detection objective. The measure scores are for the most recent month. For the analytics rules, the user interface shows the total number of rules enabled (680) for the measure during the most recent month, and the number of rules satisfied (685) for the measure during the most recent month. The number of "satisfied" rules are the number of rules that were able to trigger (i.e., the cybersecurity system received all the data needed to evaluate those rules during the most recent month). The same is shown for the correlation rules.

FIG. 7 illustrates an example user interface in which recommendations that will lead to improvements in the objective score (i.e., score 620 in FIG. 6) are displayed. Section 710 of the UI displays a ranked list of data sources for which parser improvements are recommended. Each row corresponds to a data source (where the data source is the combination of the vendor 715 and the product 720). Each row specifies the data category 725 to which the data source belongs, the average parser score 730 for the data source, and the action status 735. The user interface also includes a call to action 735 that takes a user to another user interface where they can see more information about the parsers, their performance, and the regular expressions used by the parsers.

Section 750 of the UI displays the top five data categories 755-777 from which the system recommends that a data source be configured for the objective.

The methods described with respect to FIGS. 1-7 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A non-transitory computer-readable medium comprising a computer program, that, when executed by a computer system, enables the computer system to perform the following method for assessing a cybersecurity system's ability to satisfy a detection objective across a set of measures used to implement the detection objective, the method comprising:

identifying a set of measures used to implement a cybersecurity detection objective, wherein the set of measures includes a set of rules, wherein the set of rules comprises cybersecurity system-provided rules and user-customized rules, and wherein identifying a set of measures used to implement a cybersecurity detection objective comprises enabling a user of the cybersecurity system to select one or more rules within the set of rules and not select one or more rules within the set of rules such that a same cybersecurity detection objective is implemented with different sets of measures by different users;

for each measure, performing the following:

identifying a first set of data fields relevant for the measure;

identifying a set of data sources and a set of parsers associated with the measure, wherein the data sources provide log data usable for cybersecurity evaluation;

receiving the log data from the set of data sources over a computer network;

parsing the log data using the set of parsers to extract a second set of data fields from the log data within a time window;

comparing the first set of data fields relevant for the measure to the second set of data fields extracted by the parsers within the time window;

computing a measure score for the measure based on the comparison, wherein the measure score is indicative of the cybersecurity system's ability to effectively implement the measure and wherein the measure score is associated with the time window; and computing an objective score indicative of the cybersecurity system's ability to satisfy the detection objective based on each of the measure scores, wherein the objective score is associated with the time window.

2. The non-transitory computer-readable medium of claim 1, further comprising:

displaying the objective score in a user interface.

3. The non-transitory computer-readable medium of claim 2, wherein the steps of claim 1 are performed at periodic intervals, and wherein a graphical representation of a trend of the objective score over a period of time is displayed in the user interface.

4. The non-transitory computer-readable medium of claim 1, wherein the set of measures includes a plurality of different measures for the detection objective, and wherein, in computing the objective score, each of the different measure scores is weighted according to a weight assigned to the corresponding measure.

5. The non-transitory computer-readable medium of claim 1, wherein the set of rules is a set of analytics rules, and wherein the measure score for the set of analytics rules is based on a ratio of: (1) a number of analytics rules for which the parsers produce all the data needed to evaluate the rules within the time window and (2) a total number of analytics rules in the set of rules.

6. The non-transitory computer-readable medium of claim 1, wherein the set of rules is a set of correlation rules, wherein the first set of fields is equal to the number of fields in the correlation rules, and wherein the measure score for the set of correlation rules is based on a ratio of: (1) a number of fields in the first set of fields that are also in the second set of fields produced by the parsers, and (2) a total number of fields in the first set of fields.

7. The non-transitory computer-readable medium of claim 1, wherein the set of measures also includes a dashboard, wherein the first set of fields is equal to the number of fields for which the dashboard is configured to display, and wherein the measure score for the dashboard is based on a ratio of: (1) a number of fields in the first set of fields that are also in the second set of fields produced by the parsers, and (2) a total number of fields in the first set of fields.

8. The non-transitory computer-readable medium of claim 1, further comprising providing recommendations that will lead to an improved objective score.

9. The non-transitory computer-readable medium of claim 8, wherein providing recommendations includes recommending parser improvements for one or more of the data sources in the set of data sources.

10. The non-transitory computer-readable medium of claim 8, wherein providing recommendations includes recommending data categories from which to add a data source to the set of data sources.

11. A computer system for assessing a cybersecurity system's ability to satisfy a detection objective across a set of measures used to implement the detection objective, the system comprising:

one or more processors;

one or more memory units coupled to the one or more processors, wherein the one or more memory units store instructions that, when executed by the one or more processors, cause the system to perform the operations of:

identifying a set of measures used to implement a cybersecurity detection objective, wherein the set of measures includes a set of rules, wherein the set of rules comprises cybersecurity system-provided rules and user-customized rules, and wherein identifying a set of measures used to implement a cybersecurity detection objective comprises enabling a user of the cybersecurity system to select one or more rules within the set of rules and not select one or more rules within the set of rules such that a same cybersecurity detection objective is implemented with different sets of measures by different users;

for each measure, performing the following:

identifying a first set of data fields relevant for the measure;

identifying a set of data sources and a set of parsers associated with the measure, wherein the data sources provide log data usable for cybersecurity evaluation;

receiving the log data from the set of data sources over a computer network;

parsing the log data using the set of parsers to extract a second set of data fields from the log data within a time window;

comparing the first set of data fields relevant for the measure to the second set of data fields extracted by the parsers within the time window;

computing a measure score for the measure based on the comparison, wherein the measure score is indicative of the cybersecurity system's ability to effectively implement the measure and wherein the measure score is associated with the time window; and computing an objective score indicative of the cybersecurity system's ability to satisfy the detection objective based on each of the measure scores, wherein the objective score is associated with the time window.

12. The system of claim 11, further comprising:

displaying the objective score in a user interface.

13. The system of claim 12, wherein the steps of claim 11 are performed at periodic intervals, and wherein a graphical representation of a trend of the objective score over a period of time is displayed in the user interface.

14. The system of claim 11, wherein the set of measures includes a plurality of different measures for the detection objective, and wherein, in computing the objective score, each of the different measure scores is weighted according to a weight assigned to the corresponding measure.

15. The system of claim 11, wherein the set of rules is a set of analytics rules, and wherein the measure score for the set of analytics rules is based on a ratio of: (1) a number of analytics rules for which the parsers produce all the data needed to evaluate the rules within the time window and (2) a total number of analytics rules in the set of rules.

16. The system of claim 11, wherein the set of rules is a set of correlation rules, wherein the first set of fields is equal to the number of fields in the correlation rules, and wherein the measure score for the set of correlation rules is based on a ratio of: (1) a number of fields in the first set of fields that are also in the second set of fields produced by the parsers, and (2) a total number of fields in the first set of fields.

17. The system of claim 11, wherein the set of measures also includes a dashboard, wherein the first set of fields is equal to the number of fields for which the dashboard is configured to display, and wherein the measure score for the dashboard is based on a ratio of: (1) a number of fields in the first set of fields that are also in the second set of fields produced by the parsers, and (2) a total number of fields in the first set of fields.

18. The system of claim 11, further comprising providing recommendations that will lead to an improved objective score.

19. The system of claim 18, wherein providing recommendations includes recommending parser improvements for one or more of the data sources in the set of data sources.

20. The system of claim 18, wherein providing recommendations includes recommending data categories from which to add a data source to the set of data sources.

21. A method, performed by a computer system, for assessing a cybersecurity system's ability to satisfy a detection objective across a set of measures used to implement the detection objective, the method comprising:

identifying a set of measures used to implement a cybersecurity detection objective, wherein the set of measures includes a set of rules, wherein the set of rules comprises cybersecurity system-provided rules and user-customized rules, and wherein identifying a set of measures used to implement a cybersecurity detection objective comprises enabling a user of the cybersecurity system to select one or more rules within the set of rules and not select one or more rules within the set of rules such that a same cybersecurity detection objective is implemented with different sets of measures by different users;

for each measure, performing the following:

identifying a first set of data fields relevant for the measure;

identifying a set of data sources and a set of parsers associated with the measure, wherein the data sources provide log data usable for cybersecurity evaluation;

receiving the log data from the set of data sources over a computer network;

parsing the log data using the set of parsers to extract a second set of data fields from the log data within a time window;

comparing the first set of data fields relevant for the measure to the second set of data fields extracted by the parsers within the time window;

computing a measure score for the measure based on the comparison, wherein the measure score is indicative of the cybersecurity system's ability to effectively implement the measure and wherein the measure score is associated with the time window; and computing an objective score indicative of the cybersecurity system's ability to satisfy the detection objective based on each of the measure scores, wherein the objective score is associated with the time window.

* * * * *